(12) United States Patent
Mossberg et al.

(10) Patent No.: US 8,180,188 B2
(45) Date of Patent: *May 15, 2012

(54) MULTIMODE PLANAR WAVEGUIDE SPECTRAL FILTER

(75) Inventors: Thomas W. Mossberg, Eugene, OR (US); Christoph M. Greiner, Eugene, OR (US); Dmitri Iazikov, Springfield, OR (US)

(73) Assignee: Steyphi Services DE LLC, Dover, DE (US)

( * ) Notice: Subject to any disclaimer, the term of this patent is extended or adjusted under 35 U.S.C. 154(b) by 91 days.

This patent is subject to a terminal disclaimer.

(21) Appl. No.: 12/785,950

(22) Filed: May 24, 2010

(65) Prior Publication Data

US 2010/0327150 A1 Dec. 30, 2010

Related U.S. Application Data

(63) Continuation of application No. 12/367,159, filed on Feb. 6, 2009, now Pat. No. 7,742,674, which is a continuation of application No. 11/334,039, filed on (Continued)

(51) Int. Cl.
*G02B 6/34* (2006.01)
(52) U.S. Cl. ............................................. 385/37; 385/39
(58) Field of Classification Search .................. 385/1, 3, 385/8, 9, 10, 14, 36, 37, 123; 359/565, 566, 359/569, 570, 576
See application file for complete search history.

(56) References Cited

U.S. PATENT DOCUMENTS 3,995,937 A 12/1976 Baues et al.

(Continued)

FOREIGN PATENT DOCUMENTS

EP 0310438 4/1989

(Continued)

OTHER PUBLICATIONS

Salehi et al., "Coherent Ultrashort Light Pulse Code-Division Multiple Access Communication Systems," Journal of Lightwave Technology, Mar. 1990, vol. 8, No. 3, pp. 478-490.

(Continued)

*Primary Examiner* — Charlie Peng
(74) *Attorney, Agent, or Firm* — Schwabe, Williamson & Wyatt, P.C.

(57) ABSTRACT

A spectral filter comprises a planar optical waveguide having at least one set of diffractive elements. The waveguide confines in one transverse dimension an optical signal propagating in two other dimensions therein. The waveguide supports multiple transverse modes. Each diffractive element set routes, between input and output ports, a diffracted portion of the optical signal propagating in the planar waveguide and diffracted by the diffractive elements. The diffracted portion of the optical signal reaches the output port as a superposition of multiple transverse modes. A multimode optical source may launch the optical signal into the planar waveguide, through the corresponding input optical port, as a superposition of multiple transverse modes. A multimode output waveguide may receive, through the output port, the diffracted portion of the optical signal. Multiple diffractive element sets may route corresponding diffracted portions of optical signal between one or more corresponding input and output ports.

14 Claims, 5 Drawing Sheets

Related U.S. Application Data

Jan. 17, 2006, now Pat. No. 7,499,612, which is a continuation of application No. 10/842,790, filed on May 11, 2004, now Pat. No. 6,987,911, which is a continuation-in-part of application No. 10/653,876, filed on Sep. 2, 2003, now Pat. No. 6,829,417, which is a continuation-in-part of application No. 10/229,444, filed on Aug. 27, 2002, now Pat. No. 6,678,429, said application No. 10/842,790 is a continuation of application No. 09/811,081, filed on Mar. 16, 2001, now Pat. No. 6,879,441, and a continuation-in-part of application No. 09/843,597, filed on Apr. 26, 2001, now Pat. No. 6,965,464.

(60) Provisional application No. 60/486,451, filed on Jul. 10, 2003, provisional application No. 60/315,302, filed on Aug. 27, 2001, provisional application No. 60/370,182, filed on Apr. 4, 2002, provisional application No. 60/468,479, filed on May 7, 2003, provisional application No. 60/486,450, filed on Jul. 10, 2003, provisional application No. 60/190,126, filed on Mar. 16, 2000, provisional application No. 60/199,790, filed on Apr. 26, 2000, provisional application No. 60/235,330, filed on Sep. 26, 2000, provisional application No. 60/247,231, filed on Nov. 10, 2000.

(56) References Cited

U.S. PATENT DOCUMENTS

| | | | |
|---|---|---|---|
| 4,006,967 | A | 2/1977 | Kennan et al. |
| 4,140,362 | A | 2/1979 | Tien |
| 4,387,955 | A | 6/1983 | Ludman et al. |
| 4,440,468 | A | 4/1984 | Auracher et al. |
| 4,660,934 | A | 4/1987 | Akiba et al. |
| 4,740,951 | A | 4/1988 | Lizet et al. |
| 4,743,083 | A | 5/1988 | Schimpe |
| 4,746,186 | A | 5/1988 | Nicia |
| 4,773,063 | A | 9/1988 | Hunsperger et al. |
| 4,786,133 | A | 11/1988 | Gidon et al. |
| 4,803,696 | A | 2/1989 | Pepper et al. |
| 4,824,193 | A | 4/1989 | Maeda et al. |
| 4,834,474 | A | 5/1989 | George et al. |
| 4,846,552 | A | 7/1989 | Veldkamp et al. |
| 4,852,960 | A | 8/1989 | Alferness et al. |
| 4,923,271 | A | 5/1990 | Henry et al. |
| 4,938,553 | A | 7/1990 | Maerz |
| 5,040,864 | A | 8/1991 | Hong |
| 5,042,898 | A | 8/1991 | Morey et al. |
| 5,093,874 | A | 3/1992 | Hawkins et al. |
| 5,107,359 | A | 4/1992 | Ohuchida |
| 5,165,104 | A | 11/1992 | Weverka |
| 5,195,161 | A | 3/1993 | Adar et al. |
| 5,274,657 | A | 12/1993 | Hori et al. |
| 5,357,591 | A | 10/1994 | Jiang et al. |
| 5,450,511 | A | 9/1995 | Dragone et al. |
| 5,453,871 | A | 9/1995 | Kolner et al. |
| 5,668,900 | A | 9/1997 | Little et al. |
| 5,768,450 | A | 6/1998 | Bhagavatula |
| 5,812,318 | A | 9/1998 | Babbitt et al. |
| 5,830,622 | A | 11/1998 | Canning et al. |
| 5,887,094 | A | 3/1999 | Bakhti et al. |
| 5,907,647 | A | 5/1999 | Eggleton et al. |
| 5,995,691 | A | 11/1999 | Arai et al. |
| 6,011,884 | A | 1/2000 | Dueck et al. |
| 6,011,885 | A | 1/2000 | Dempewolf et al. |
| 6,021,242 | A | 2/2000 | Harumoto et al. |
| 6,137,933 | A | 10/2000 | Hunter et al. |
| 6,144,480 | A | 11/2000 | Li et al. |
| 6,169,613 | B1 | 1/2001 | Amitai et al. |
| 6,169,614 | B1 | 1/2001 | Whitcomb et al. |
| 6,243,514 | B1 | 6/2001 | Thompson |
| 6,266,463 | B1 | 7/2001 | Laming et al. |
| 6,285,813 | B1 | 9/2001 | Schultz et al. |
| 6,323,970 | B1 | 11/2001 | Popovich |
| 6,408,118 | B1 | 6/2002 | Ahuja et al. |
| 6,473,232 | B2 | 10/2002 | Ogawa |
| 6,553,162 | B1 | 4/2003 | Okayama |
| 6,603,901 | B1 | 8/2003 | Hale et al. |
| 6,678,429 | B2 | 1/2004 | Mossberg et al. |
| 6,702,897 | B2 | 3/2004 | Cullen et al. |
| 6,718,093 | B2 | 4/2004 | Zhou |
| 6,768,834 | B1 | 7/2004 | Gruhlke |
| 6,781,944 | B1 | 8/2004 | Tanaka |
| 6,813,048 | B2 | 11/2004 | Kitamura |
| 6,823,115 | B2 * | 11/2004 | Greiner et al. ............ 385/37 |
| 6,829,417 | B2 | 12/2004 | Greiner et al. |
| 6,836,492 | B2 | 12/2004 | Ido |
| 6,850,670 | B2 | 2/2005 | Parhami et al. |
| 6,859,318 | B1 | 2/2005 | Mossberg |
| 6,876,791 | B2 | 4/2005 | Murashima et al. |
| 6,879,441 | B1 | 4/2005 | Mossberg et al. |
| 6,928,223 | B2 | 8/2005 | Walpole et al. |
| 6,961,491 | B2 | 11/2005 | Greiner et al. |
| 6,965,464 | B2 | 11/2005 | Mossberg |
| 6,965,716 | B2 | 11/2005 | Greiner et al. |
| 6,985,656 | B2 | 1/2006 | Iazikov et al. |
| 6,987,911 | B2 * | 1/2006 | Mossberg et al. ............ 385/37 |
| 6,990,276 | B2 * | 1/2006 | Brice et al. ............ 385/37 |
| 6,993,223 | B2 | 1/2006 | Greiner et al. |
| 7,003,187 | B2 | 2/2006 | Frick et al. |
| 7,009,743 | B2 | 3/2006 | Mossberg |
| 7,016,569 | B2 | 3/2006 | Mule et al. |
| 7,049,704 | B2 | 5/2006 | Chakravorty et al. |
| 7,054,517 | B2 | 5/2006 | Mossberg et al. |
| 7,062,128 | B2 | 6/2006 | Mossberg |
| 7,116,453 | B2 | 10/2006 | Mossberg |
| 7,116,852 | B2 | 10/2006 | Tuda |
| 7,120,334 | B1 | 10/2006 | Greiner et al. |
| 7,123,794 | B2 | 10/2006 | Greiner et al. |
| 7,181,103 | B1 | 2/2007 | Greiner et al. |
| 7,190,859 | B2 | 3/2007 | Greiner et al. |
| 7,194,161 | B1 | 3/2007 | Deri et al. |
| 7,194,164 | B2 * | 3/2007 | Iazikov et al. ............ 385/37 |
| 7,209,611 | B2 | 4/2007 | Joyner |
| 7,224,855 | B2 | 5/2007 | Iazikov et al. |
| 7,260,290 | B1 | 8/2007 | Greiner et al. |
| 7,286,732 | B2 | 10/2007 | Greiner et al. |
| 7,499,612 | B2 | 3/2009 | Mossberg et al. |
| 2002/0071646 | A1 | 6/2002 | Eggleton et al. |
| 2003/0011833 | A1 | 1/2003 | Yankov et al. |
| 2003/0039444 | A1 | 2/2003 | Mossberg et al. |
| 2003/0067645 | A1 | 4/2003 | Ibsen et al. |
| 2003/0068113 | A1 | 4/2003 | Janz et al. |
| 2003/0117677 | A1 | 6/2003 | Mossberg |
| 2003/0185269 | A1 | 10/2003 | Gutin |
| 2003/0206694 | A1 | 11/2003 | Babin et al. |
| 2004/0047561 | A1 | 3/2004 | Tuda |
| 2004/0076374 | A1 | 4/2004 | Greiner et al. |
| 2004/0131360 | A1 | 7/2004 | Iazikov et al. |
| 2004/0170356 | A1 | 9/2004 | Iazikov et al. |
| 2004/0173680 | A1 | 9/2004 | Mossberg et al. |
| 2004/0179779 | A1 | 9/2004 | Greiner et al. |
| 2004/0208466 | A1 | 10/2004 | Mossberg et al. |
| 2004/0258356 | A1 | 12/2004 | Brice et al. |
| 2005/0018951 | A1 | 1/2005 | Mossberg et al. |
| 2005/0063430 | A1 | 3/2005 | Doucet et al. |
| 2005/0078912 | A1 | 4/2005 | Iazikov et al. |
| 2005/0135744 | A1 | 6/2005 | Greiner et al. |
| 2005/0135745 | A1 | 6/2005 | Greiner et al. |
| 2005/0135747 | A1 | 6/2005 | Greiner et al. |
| 2005/0152011 | A1 | 7/2005 | Mossberg |
| 2005/0163425 | A1 | 7/2005 | Greiner et al. |
| 2005/0196114 | A1 | 9/2005 | Xu et al. |
| 2006/0023280 | A1 | 2/2006 | Mossberg |
| 2006/0139712 | A1 | 6/2006 | Mossberg |
| 2006/0177178 | A1 | 8/2006 | Greiner et al. |
| 2006/0193553 | A1 | 8/2006 | Mossberg et al. |
| 2006/0210214 | A1 | 9/2006 | Uhlhorn et al. |
| 2006/0233493 | A1 | 10/2006 | Mossberg |
| 2006/0256831 | A1 | 11/2006 | Volodin et al. |

FOREIGN PATENT DOCUMENTS

| | | |
|---|---|---|
| EP | 0321438 A1 | 11/2009 |
| GB | 2168215 A1 | 6/1986 |
| JP | 3033805 | 2/1991 |
| JP | 04368901 | 12/1992 |
| JP | 050129726 | 5/1993 |
| JP | 1031121 | 2/1998 |
| WO | 9935523 A1 | 7/1999 |
| WO | 9956159 | 11/1999 |
| WO | 9956159 A1 | 11/1999 |
| WO | 02054120 | 7/2002 |
| WO | 02075411 | 9/2002 |
| WO | 02075411 A1 | 9/2002 |

OTHER PUBLICATIONS

Taillaert, et al., "An Out-of-plane Grating Coupler for Efficient Butt-coupling Between Compact Planar Waveguides and Single-mode Fibers," IEEE Journal of Quantum Electronics, Jul. 2002, vol. 38, No. 7, pp. 949-955.

Taylor et al., "Determination of Diffraction Efficiency for a Second-order Corrugated Waveguide," IEEE Journal of Quantum Electronics, Feb. 1997, vol. 33, No. 2, pp. 176-186.

International Preliminary Report on Patentability, issued in International Patent Application No. PCT/US2002/027288, mailed Feb. 23, 2004.

International Preliminary Report on Patentability, issued in International Patent Application No. PCT/US2002/008199, mailed Jul. 26, 2004.

International Preliminary Report on Patentability, issued in International Patent Application No. PCT/US2002/012869, mailed Oct. 6, 2006.

International Search Report, issued in International Patent Application No. PCT/US2002/027288, mailed Jan. 2, 2003, International Search Report, issued in International Patent Application No. PCT/US2003/027472, mailed May 5, 2004.

Reasons for Allowance, issued in U.S. Appl. No. 10/898,527, mailed Jan. 24, 2007.

Reasons for Allowance, issued in U.S. Appl. No. 11/383,494, mailed Jan. 25, 2007.

Reasons for Allowance, issued in U.S. Appl. No. 11/423,856, mailed Mar. 20, 2007.

Reasons for Allowance, issued in U.S. Appl. No. 10/989,236, mailed May 6, 2005.

Reasons for Allowance, issued in U.S. Appl. No. 11/055,559, mailed Jun. 12, 2006.

Reasons for Allowance, issued in U.S. Appl. No. 10/923,455, mailed Jul. 22, 2005.

Reasons for Allowance, issued in U.S. Appl. No. 11/361,407, mailed Aug. 3, 2006.

Reasons for Allowance, issued in U.S. Appl. No. 10/794,634, mailed Aug. 5, 2005.

Reasons for Allowance, issued in U.S. Appl. No. 11/685,212, mailed Aug. 20, 2007.

Reasons for Allowance, issued in U.S. Appl. No. 10/998,185, mailed Sep. 15, 2005.

Reasons for Allowance, issued in U.S. Appl. No. 10/857,987, mailed Sep. 15, 2005.

Reasons for Allowance, issued in U.S. Appl. No. 10/229,444, mailed Sep. 23, 2003.

Reasons for Allowance, issued in U.S. Appl. No. 11/062,109, mailed Oct. 13, 2006.

Reasons for Allowance, issued in U.S. Appl. No. 11/334,039, mailed Oct. 22, 2008.

Reasons for Allowance, issued in U.S. Appl. No. 10/602,327, mailed Nov. 19, 2004.

Reasons for Allowance, issued in U.S. Appl. No. 11/239,540, mailed Dec. 5, 2005.

Reasons for Allowance, issued in U.S. Appl. No. 11/532,532, mailed Dec. 19, 2006.

Notice of Allowability, issued in U.S. Appl. No. 11/280,876, mailed Jun. 25, 2009.

Notice of Allowance, issued in U.S. Appl. No. 12/403,281, mailed Oct. 30, 2009.

Notice of Allowance, issued in U.S. Appl. No. 12/367,159, mailed Feb. 1, 2010.

Notice of Allowance, issued in U.S. Appl. No. 11/676,273, mailed Feb. 5, 2010.

Office Action, issued in U.S. Appl. No. 11/676,273, mailed Jan. 15, 2008.

Office Action, issued in U.S. Appl. No. 11/055,559, mailed Mar. 10, 2006.

Office Action, issued in U.S. Appl. No. 11/676,273, mailed Apr. 7, 2009.

Office Action, issued in U.S. Appl. No. 10/602,327, mailed May 24, 2004.

Office Action, issued in U.S. Appl. No. 11/062,109, mailed Jun. 20, 2006.

Office Action, issued in U.S. Appl. No. 11/676,273, mailed Jun. 27, 2007.

Office Action, issued in U.S. Appl. No. 11/280,876, mailed Jul. 1, 2008.

Office Action, issued in U.S. Appl. No. 11/076,251, mailed Jul. 21, 2005.

Office Action, issued in U.S. Appl. No. 11/676,273, mailed Aug. 8, 2008.

Office Action, issued in U.S. Appl. No. 10/898,527, mailed Aug. 11, 2006.

Office Action, issued in U.S. Appl. No. 11/423,856, mailed Sep. 29, 2006.

Office Action, issued in U.S. Appl. No. 11/280,876, mailed Oct. 9, 2007.

Office Action, issued in U.S. Appl. No. 11/280,876, mailed Mar. 5, 2009.

Office Action, issued in U.S. Appl. No. 12/408,039, mailed Dec. 10, 2009.

Office Action, issued in U.S. Appl. No. 12/408,039, mailed May 7, 2010.

Office Action, issued in U.S. Appl. No. 12/421,971, mailed Aug. 6, 2010.

Office Action, issued in JP Patent Application No. 2003-524057, mailed Aug. 15, 2008.

Office Action, issued in EP Patent Application No. 2796438.6, mailed Apr. 27, 2010.

Bedford et al., "Bow-Tie Surface-Emitting Lasers," IEEE Photonics Technology Letters, Aug. 2000, vol. 12, No. 8, pp. 948-950.

Eriksson et al., "Parabolic-Confocal Unstable-Resonator Semiconductor Lasers-Modeling and Experiments," IEEE Journal of Quantum Electronics, May 1998, vol. 34, No. 5, pp. 858-868.

Eriksson et al., "Surface-Emitting Unstable-Resonator Lasers with Integrated Diffractive Beam-Forming Elements," IEEE Photonics Technology Letters, Dec. 1997, vol. 9, No. 12, pp. 1570-1572.

Kazarinov et al., "Narrow-Band Resonant Optical Reflectors and Resonant Optical Transformers for Laser Stabilization and Wavelength Division Multiplexing," IEEE Journal of Quantum Electronics, Sep. 1987, vol. QE-23, No. 9, pp. 1419-1425.

Kristjansson et al., "Surface-Emitting Tapered Unstable Resonator Laser with Integrated Focusing Grating Coupler," IEEE Photonics Technology Letters, Oct. 2000, vol. 12, No. 10, pp. 1319-1321.

Modh et al, "Deep-Etched Distributed Bragg Reflector Lasers with Curved Mirrors-Experiments and Modeling," IEEE Journal of Quantum Electronics, Jun. 2001, vol. 37, No. 6, pp. 752-761.

Notice of Allowance, issued in U.S. Appl. No. 12/421,971, mailed Nov. 10, 2010.

Notice of Allowance, issued in U.S. Appl. No. 12/408,039, mailed Jan. 28, 2011, 8 pages.

Reason for Allowance for U.S. Appl. No. 10/842,790 mailed Sep. 16, 2005.

Office Action for U.S. Appl. No. 10/653,876 mailed May 18, 2004.

Office Action for U.S. Appl. No. 09/843,597 mailed Jun. 30, 2004.

Office Action for U.S. Appl. No. 09/843,597 mailed Jan. 12, 2005.

Reasons for Allowance for U.S. Appl. No. 09/843,597 mailed May 19, 2005.

Office Action for U.S. Appl. No. 11/334,039 mailed May 30, 2008.

Office Action for U.S. Appl. No. 09/811,081 mailed Apr. 2, 2003.

Office Action for U.S. Appl. No. 09/811,081 mailed Aug. 5, 2003.
Office Action for U.S. Appl. No. 09/811,081 mailed Dec. 30, 2003.
Office Action for U.S. Appl. No. 09/811,081 mailed Jun. 15, 2004.
Reasons for Allowance for U.S. Appl. No. 09/811,081 mailed Nov. 19, 2004.
Mossberg, T.W., "Planar Holographic Optical Processing Devices", Optics Letters vol. 26 No. 7, Apr. 1, 2001.
Lohmann et al, "Graphic Codes for Computer Holography", Applied Optics vol. 34 No. 17, Jun. 10, 1995.
Hirayama et al., "Novel Surface Emitting Laser Diode Using Photonic Band-Gap Cavity", Applied Physics Letters vol. 69 No. 6, Aug. 5, 1996.
Brady, D.J. et al., "Holographic Interconnections in Photo-refractive Waveguides", Applied Optics vol. 30 No. 17, Jun. 10, 1991.
Preston, K., Jr., "Digital Holographic Logic", Pattern Recognition vol. 5, 1973, pp. 37-49.
Ura, Shogo et al., "Integrated Optic Wavelength Demultiplexer Using a Coplanar Grating Lens", Applied Optics vol. 29 No. 9, pp. 1369-1373, Mar. 20, 1990, Optical Society of America, New York USA.
Chen, Ray T., et al., "Ten Channel Single-Mode Wavelength Division Demultiplexer in Near IR", Integrated Optical Circuits vol. 1583, pp. 134-142, Sep. 3, 1991, The International Society for Optical Engineering, Boston, Massachusetts, USA.
Babbitt, W.R. et al., "Spatial Routing of Optical Beams Through Time-Domain Spatial-Spectral Filtering", Optics Letters vol. 20 No. 8, pp. 910-910, Apr. 15, 1995, Optical Society of America, USA.
Capron, B.A. et al., "Design and Performance of a Multiple Element Slab Waveguide Spectrograph for Multimode Fiber-Optic WDM Systems", Journal of LightWave Technology vol. 11 No. 12, Dec. 1993, IEEE Log No. 9211169, pp. 2009-2014.
Den, R.J. et al., "Quantitative Analysis of Integrated Optic Waveguide Spectrometers", IEEE Photonics Technology Letters vol. 6 No. 2, pp. 242-244, Feb. 1994.
Grunnet-Jepson, A. et al., "Fibre Bragg Grating Based Spectral Encoder/Decoder for Lightwave CDMA", Electronics Letters vol. 35 No. 13, pp. 1096-1097, Jun. 24, 1999.
P. Paddon and Jeff F. Young, "Simple Approach to Coupling in Textured Planar Waveguides", Optical Society of America 1998 vol. 23 No. 19, pp. 1529-1531.
Madsen, C.K. et al., "Planar Waveguide Optical Spectrum Analyzer Using a UV-Induced Grating", IEEE Journal of Selected Topics in Quantum Electronics vol. 4 No. 5, pp. 925-929, Nov. 1998.
Gini, E. et al, "Polarization Independent InP WDM Multiplexer/Demultiplexer Module", Journal of Lightwave Technology vol. 16 No. 4, pp. 625-630, Apr. 1998.
Day, Robert W. et al., "Filter-Response Line Shapes of Resonant Waveguide Gratings", Journal of Lightwave Technology vol. 14 No. 8, pp. 1815-1824, Aug. 1996.
McGreer, K.A., "Tunable Planar Concave Grating Demultiplexer", IEEE Photonics Technology Letters vol. 8 No. 4, pp. 551-553, Apr. 1996.
Tang, Suning et al., "A Novel Wavelength-Division-Demultiplexer with Optical In-Plane to Surface-Normal Conversion", IEEE Photonics Technology Letters vol. 7 No. 8, Aug. 1995.
McGreer, K.A., "Diffraction from Concave Gratings in Planar Waveguides", IEEE Photonics Technology Letters vol. 7 No. 3, pp. 324-326, Mar. 1995.
Takenouchi, Hirokazu et al., "Analysis of Optical-Signal Processing Using an Arrayed-Waveguide Grating", Optics Express vol. 6 No. 6, pp. 124-135, Mar. 13, 2000.
Grunnet-Jepson, A. et al., "Demonstration of All-Fibre Sparse Lightwave CDMA Based on Temporal Phase Encoding", Photonics Technology Letters vol. 11 No. 10, pp. 1283-1285, Oct. 1999.
Babbitt, Randall. et al., "Optical Waveform Processing and Routing with Structured Surface Gratings", Optics Communications 148, pp. 23-26, 1998.
Brigham, Gerald A. et al., "Analysis of Scattering from Large Planar Gratings of Compliant Cylindrical Shells", Acoust Society of America vol. 61 No. 1, pp. 48-59, Jan. 1997.
Kurokawa, T. et al., "Time-Space-Conversion Optical Signal Processing Using Arrayed-Waveguide Grating", Electronics Letters vol. 33 No. 22, pp. 1890-1891, Oct. 23, 1997.
Sudbo, A.S. et al., "Reflectivity of Integrated Optical Filters Based on Elliptic Bragg Reflectors", Journal of Lightwave Technology vol. 8 No. 6, pp. 998-1006, Jun. 1990.
Henry, Charles H., "Four-Channel Wavelength Division Mulitplexers and Bandpass Filters Based on Elliptical Bragg Reflectors", Journal of Lightwave Technology vol. 8 No. 5, pp. 748-755, IEEE May 1990.
Koontz, E.M. et al., "Preservation of Rectangular-Patterned InP Gratings Overgrown by Gas Source Molecular Beam Epitaxy", Applied Physics Letters vol. 71 No. 10, pp. 1400-1402, Sep. 1997.
Song, Seok Ho et al., "Focusing-Grating-Coupler Arrays for Uniform and Efficient Signal Distribution in a Backboard Optical Interconnect", Optical Society of America 1995, Applied Optics vol. 34 No. 26, pp. 5913-5919, Sep. 10, 1995.
Brazas, John C. et al., "Analysis of Input-Grating Couplers Having Finite Lengths", Applied Optics vol. 34 No. 19, pp. 3786-3792, Jul. 1, 1995.
Bates, Keith A. et al., "Gaussian Beams from Variable Groove Depth Grating Couplers in Planar Waveguides", Applied Optics vol. 32 No. 12, pp. 2112-2116, Apr. 20, 1993.
Wang, S.S. et al., "Theory and Application of Guided-Mode Resonance Filters", Applied Optics vol. 32 No. 14, pp. 2606-2613, May 10, 1993.
Magnusson, R. et al., "New Principle for Optical Filters", American Institute of Physics 1992, Applied Physics Letters vol. 61 No. 9, pp. 1022-1024, Aug. 31, 1992.
Ojha, S.M. et al. "Demonstration of Low Loss Integrated InGaAsP/InP Demultiplexer Devices with Low Polarisation Sensitivity", Electronics Letter vol. 29 No. 9, Apr. 29, 1993.
Li, Lifeng, "Analysis of Planar Waveguide Grating Couplers with Double Surface Corrugations of Identical Period", 1995 Elsevier Science B.V, Optics Communications 114, pp. 406-412.
Soole, J.B.D. et al., "High Speed Monolithic WDM Detector for 1.5 um Fiber Band", Electronics Letters vol. 31 No. 15, pp. 1276-1277, Jul. 20, 1995.
Rantala, J.T. et al., "Sol-gel Hybrid Glass Diffractive Elements by Direct Electron-Beam Exposure", Electronics Letters vol. 34 No. 5, pp. 455-456, Mar. 5, 1998.
Cowin, M.A. et al., "Compact Polymeric Wavelength Division Multiplexer", Electronics Letters vol. 35 No. 13, pp. 1074-1076, Jun. 24, 1999.
Canning, J. et al., "Grating Structures with Phase Mask Period in Silica-on-Silicon Planar Waveguides", 1999 Elsevier Science B.V., Optics Communications 171, pp. 213-217.
Tien, P.K. et al., "Use of Concentric-Arc Grating as a Thin-Film Spectrograph for Guided Waves", 1980 American Institute of Physics, pp. 524-525.
Kaneko, Akimasa et al., "Design and Application of Silica-Based Planar Lightwave Circuits", IEEE Journal of Selected Topics in Quantum Electronics vol. 5 No. 5, pp. 1227-1236, Sep./Oct. 1999.
Sun, Z.J. et al., "Demultiplexer with 120 Channels and 0.29-nm Channel Spacing", IEEE Photonics Technology Letters vol. 10 No. 1, pp. 90-92, Jan. 1998.
Avrutsky, Ivan A. et al., "Multiwavelength Diffraction and Apodization Using Binary Superimposed Gratings", IEEE Photonics Technology Letters vol. 10 No. 6, pp. 839-841, Jun. 1998.
Alavie, A.T. et al., "A Multiplexed Bragg Grating Fiber Laser Sensor System", IEEE Photonics Technology Letters vol. 5 No. 9, pp. 1112-1114, Sep. 1993.
Fu, Xiaoli et al., "1×8 Supergrating Wavelength-Division Demultiplexer in a Silica Planar Waveguide", 1997 Optical Society of America, Optics Letters vol. 22 No. 21, pp. 1627-1629.
Wang, M.R. et al., "Five-Channel Polymer Waveguide Wavelength Division Multiplexer for the Near Infrared", IEEE Photonica Technology Letters vol. 3 No. 1, pp. 36-38, Jan. 1991.
Wang, Michael R. et al., "Wavelength-Division Multiplexing and Demultiplexing on Locally Sensitized Single-Mode Polymer Microstructure Waveguides", 1990 Optical Society of America, Optics Letters vol. 15 No. 7, pp. 363-365, Apr. 1, 1990.
Wu, Chunmeng et al., "Simplified Coupled-Wave Equations for Cylindrical Waves in Circular Grating Planar Waveguides", Journal of Lightwave Technology vol. 10 No. 11, pp. 1575-1589, Nov. 1992.

Eldada, Louay et al., "Dispersive Properties of Planar Polymer Bragg Gratings", IEEE Photonics Technology Letters vol. 12 No. 7, pp. 819-821, Jul. 7, 2000.

Chen, Ray T. et al., "Guided-Wave Planar Optical Interconnects Using Highly Multiplexed Polymer Waveguide Holograms", Journal of Lightwave Technology vol. 10 No. 7, pp. 888-897, Jul. 1992.

Minier, V. et al., "Diffraction Characteristics of Superimposed Holographic Gratings in Planar Optical Waveguides", IEEE Photonics Technology Letters vol. 4 No. 10, Oct. 1992.

Miya, Tetsuo, "Silica-Based Planar Lightwave Circuits: Passive and Thermally Active Devices", IEEE Journal of Selected Topics in Quantum Electronics vol. 6 No. 1, pp. 38-45, Jan./Feb. 2000.

Backlund, Johan et al., "Multifunctional Grating Couplers for Bidirectional Incoupling into Planar Waveguides", IEEE Photonics Technology Letters vol. 12 No. 3, pp. 314-316, Mar. 2000.

Wiesmann, D. et al., "Apodized Surface-Corrugated Gratings with Varying Duty Cycles", IEEE Photonics Technology Letters vol. 12 No. 6, pp. 639-641, Jun. 6, 2000.

Weiner, A.M., et al., "Femtosecond Spectral Holography" IEEE Journal of Quantum Electronics vol. 28 No. 10, pp. 2251-2261, 1992.

Chang, Y.L., et al., "Fiber-Optic Ladder Networks for Inverse Decoding Coherent CDMA", Journal of Lightwave Techology vol. 10 No. 12, pp. 1952-1962, Dec. 1992.

Sampson, D.D, et al., "Photonic CDMA by Coherent Matched Filtering Using Time-Addressed Coding in Optical Ladder Networks", Journal of Lightwave Technology vol. 12 No. 11, pp. 2001-2010, Nov. 1994.

Cornwell, W.D, et al., "Experimental Demonstration of Coherent Coding of Picosecond Pulses", Electronics Letters vol. 34 No. 2, pp. 204-2-5, 1998.

Capmany, J., et al., "Autocorrelation Pulse Distortion in Optical Fiber CDMA Systems Employing Ladder Networks", Journal of Lightwave Technology vol. 17 No. 4, p. 570, 1999.

Marhic, M.E., "Coherent Optical CDMA Networks", Journal of Lightwave Technology vol. 11 No. 5, pp. 854-864, 1993.

Mossberg, T.W., "Time-Domain Frequency-Selective Optical Data Storage", Optics Letters vol. 7 No. 2, pp. 77-79, 1982.

Bai, Y.S., et al., "Real-Time Optical Waveform Convolver/Cross Correlator", Applied Physics Letters vol. 45 No. 7, pp. 714-716 (1984).

Merkel, K.D., et al., "Optical Coherent Transient True-Time Delay Regenerator", Optics Letters vol. 21 No. 15, pp. 1102-1104, Aug. 1, 1996.

Chen, L.R., et al., "Applications of Ultrashort Pulse Propagation in Bragg Gratings for Wavelength-Division Multiplexing and Code-Division Multiple Access", IEEE Journal of Quantum Electronics vol. 34 No. 11, pp. 2117-2129, Nov. 1998.

Chen, L.R. et al. "Wavelength-Encoding/Temporal-Spreading Optical Code Division Multiple-Access System with In-Fiber Moiré Gratings", Applied Optics vol. 38 No. 21, pp. 4500-4508 (1999).

Fathallah, H. et al., "Passive Optical Fast Frequency-Hop CDMA Communication System", Journal of Lightwave Technology, vol. 17 No. 3, pp. 397-405, Mar. 1999.

Kato, K. et al., "PLC Hybrid Integration Technology and Its Application to Photonics Components", vol. 6 No. 1, pp. 4-13, Jan./Feb. 2000.

Mazurenko, Yu T., Sov. Tech. Phys. Lett. 10, 228 (1984); Appl. Phys. B 50, 101 (1990); Opt. Eng. 31, 739 (1992).

International Search Report for PCT App. PCT/US2002/12869 mailed Feb. 26, 2003.

International Search Report for PCT App. PCTUS2002/08199 mailed Aug. 22, 2002.

Mazurenko, Y.T., "Holography of Wave Packets", Applied Physics B 50 pp. 101-114 (1990).

Mazurenko, Y.T., "Time-Domain Fourier Transform Holography and Possible Applications in Signal Processing", Optical Engineering vol. 31 No. 4 pp. 739-749 Apr. 1992.

Mossberg, et al., "Lithographic Holography in Planar Waveguides", SPIE International Technical Group Newsletter vol. 12 No. 2 Nov. 2001.

Notice of Allowance mailed Jan. 28, 2010 for U.S. Appl. No. 11/280,876.

Notice of Allowance mailed Jan. 8, 2010 for U.S. Appl. No. 11/676,273.

Office Action mailed Dec. 30, 2009 for U.S. Appl. No. 12/421,971.

Notice of Allowance mailed Mar. 2, 2010 for U.S. Appl. No. 12/403,281.

Office Action, issued in Japanese Patent Application No. 2003-524057, Mar. 18, 2010.

Final Notice of Rejection, issued in JP Patent Application No. 2003-524057, mailed Sep. 9, 2011, 3 pages.

* cited by examiner

MULTIMODE PLANAR WAVEGUIDE SPECTRAL FILTER

BENEFIT CLAIMS TO RELATED APPLICATIONS

This application is a continuation of U.S. non-provisional application Ser. No. 12/367,159, which in turn is a continuation of U.S. non-provisional application Ser. No. 11/334,039 filed Jan. 17, 2006, which in turn is a continuation of U.S. non-provisional application Ser. No. 10/842,790 filed May 11, 2004 (now U.S. Pat. No. 6,987,911), which in turn claims benefit of U.S. provisional App. No. 60/486,451 filed Jul. 10, 2003, said provisional and non-provisional applications being hereby incorporated by reference as if fully set forth herein.

Said U.S. application Ser. No. 10/842,790 is a continuation-in-part of U.S. non-provisional application Ser. No. 10/653,876 filed Sep. 2, 2003 (now U.S. Pat. No. 6,829,417), which is in turn a continuation-in-part of U.S. non-provisional application Ser. No. 10/229,444 filed Aug. 27, 2002 (now U.S. Pat. No. 6,678,429). Said application Ser. No. 10/229,444 in turn claims benefit of U.S. provisional App. No. 60/315,302 filed Aug. 27, 2001 and U.S. provisional App. No. 60/370,182 filed Apr. 4, 2002. Said application Ser. No. 10/653,876 in turn claims benefit of U.S. provisional App. No. 60/468,479 filed May 7, 2003 and U.S. provisional App. No. 60/486,450 filed Jul. 10, 2003. Each of said provisional and non-provisional applications is hereby incorporated by reference as if fully set forth herein.

Said U.S. application Ser. No. 10/842,790 is a continuation-in-part of U.S. non-provisional application Ser. No. 09/811,081 filed Mar. 16, 2001 (now U.S. Pat. No. 6,879,441), and a continuation-in-part of U.S. non-provisional application Ser. No. 09/843,597 filed Apr. 26, 2001 (now U.S. Pat. No. 6,965,464) which is in turn a continuation-in-part of said application Ser. No. 09/811,081. Said application Ser. No. 09/811,081 in turn claims benefit of U.S. provisional App. No. 60/190,126 filed Mar. 16, 2000, U.S. provisional App. No. 60/199,790 filed Apr. 26, 2000, U.S. provisional App. No. 60/235,330 filed Sep. 26, 2000, and U.S. provisional App. No. 60/247,231 filed Nov. 10, 2000. Each of said provisional and non-provisional applications is hereby incorporated by reference as if fully set forth herein.

BACKGROUND

The field of the present invention relates to optical devices incorporating distributed optical structures. In particular, multimode planar waveguide spectral filters are disclosed herein.

SUMMARY

A spectral filter comprises a planar optical waveguide having at least one set of diffractive elements. The planar optical waveguide substantially confines in one transverse spatial dimension an optical signal propagating in two other spatial dimensions therein. The planar waveguide supports multiple optical transverse modes in the confined transverse dimension. Each diffractive element set routes, between a corresponding input optical port and a corresponding output optical port, a corresponding diffracted portion of the optical signal propagating in the planar waveguide that is diffracted by the diffractive element set. The corresponding diffracted portion of the optical signal reaches the corresponding output optical port as a superposition of multiple optical transverse modes supported by the planar optical waveguide. A corresponding multimode optical source may be positioned and aligned so as to launch the optical signal into the planar waveguide, through the corresponding input optical port, as a superposition of multiple optical transverse modes supported by the planar optical waveguide. A corresponding multimode output waveguide may be positioned and aligned so as to receive, through the corresponding output optical port, the corresponding diffracted portion of the optical signal. Multiple diffractive element sets may route corresponding diffracted portions of optical signal between one or more corresponding input optical ports and one or more corresponding output optical ports.

Objects and advantages pertaining to multimode planar waveguide spectral filters may become apparent upon referring to the disclosed embodiments as illustrated in the drawings and disclosed in the following written description and/or claims

The embodiments shown in the Figures are exemplary, and should not be construed as limiting the scope of the present disclosure and/or appended claims.

DETAILED DESCRIPTION OF EMBODIMENTS

A spectral filter according to the present disclosure comprises a multimode planar optical waveguide having at least one set of diffractive elements. The planar optical waveguide substantially confines in one transverse dimension optical signals propagating in the other two spatial dimensions. The planar waveguide supports multiple transverse optical modes in the confined transverse dimension. An optical signal propagates through the multimode planar optical waveguide as a superposition of the supported optical modes. However, the relative phases of the modes of such a superposition generally vary with propagation distance through the waveguide, since the optical modes propagate at differing phase velocities (i.e., the waveguide exhibits modal dispersion). The planar waveguide typically comprises a core (a two-dimensional sheet or layer) surrounded by lower-index cladding. The core is fabricated using one or more dielectric materials substantially transparent over a desired operating wavelength range. In some instances one or both claddings may be vacuum, air, or other ambient atmosphere. More typically, one or both claddings comprise layers of dielectric material(s), with the cladding refractive indices $n_1$ and $n_2$ typically being smaller than the core refractive index $n_{core}$. (In some instances in which short optical paths are employed and some degree of optical loss can be tolerated, the cladding indices might be larger than the core index while still enabling the planar waveguide to support guided, albeit lossy, optical modes.)

The planar waveguide may be secured to a substrate, for facilitating manufacture, for mechanical support, and/or for other reasons.

The set of diffractive elements of the spectral filter may also be referred to as: a set of holographic elements; a volume hologram; a distributed reflective element, distributed reflector, or distributed Bragg reflector (DBR); a Bragg reflective grating (BRG); a holographic Bragg reflector (HBR); a directional photonic-bandgap structure; a mode-selective photonic crystal; or other equivalent terms of art. Each diffractive element of the set diffracts, reflects, scatters, or otherwise redirects a portion of an incident optical signal (said process hereinafter simply referred to as diffraction). Each diffractive element of the set typically comprises some suitable alteration of the planar waveguide (ridge, groove, index modulation, density modulation, and so on), and is spatially defined by a virtual two-dimensional curvilinear diffractive element contour, the curvilinear shape of the contour typically being configured to impart desired spatial characteristics onto the diffracted portion of the optical signal. The curvilinear diffractive elements of the set (or equivalently, their corresponding contours) are spatially arranged with respect to one another so that the corresponding portions of the optical signal diffracted by each element interfere with one another, so as to impart desired spectral and/or temporal characteristics onto the portion of the optical signal collectively diffracted from the set of diffractive elements. The diffractive elements in the set are arranged so that an input optical signal, entering the planar waveguide through an input optical port, is successively incident on diffractive elements of the set. A fraction of the incident amplitude is diffracted by a diffractive element and the remainder transmitted and incident on another diffractive element, and so on successively through the set of diffractive elements. The diffractive elements are therefore spaced substantially longitudinally along the propagation direction of the incident optical signal (in contrast to a traditional surface grating, in which the diffractive elements, i.e. grating lines, are spaced transversely across the wavefront of a normally incident optical signal). Each curvilinear diffractive element is shaped to direct its diffracted portion of the optical signal to an output optical port, typically propagating back through earlier diffractive elements of the set. The relative spatial arrangement (i.e. longitudinal spacing) of the diffractive elements of the set yields desired spectral and/or temporal characteristics for the overall diffracted optical signal reaching the output optical port. It should be noted that optical ports (input and/or output) may be defined structurally (for example, by an aperture, waveguide, fiber, lens, or other optical component) and/or functionally (i.e., by a spatial location, convergence/divergence/collimation, and/or propagation direction). For a single-mode planar waveguide, such a set of diffractive elements may be arranged to yield an arbitrary spectral transfer function (in terms of amplitude and phase). In a multimode planar waveguide, the subject of the present disclosure, modal dispersion and mode-to-mode coupling of diffracted portions of the optical signal limit the range of spectral transfer functions that may be implemented.

The set of diffractive elements of the spectral filter provides dual functionality, spatially routing an optical signal between an input optical port and an output optical port, while at the same time acting as a spectral filter. The curvilinear diffractive elements may be designed (by computer generation, for example) so as to provide optimal routing, imaging, or focusing of the optical signal between an input optical port and a desired output optical port, thus reducing or minimizing insertion loss of the spectral filter. Simple curvilinear diffractive elements (segments of circles, ellipses, parabolas, hyperbolas, and so forth), if not optimal, may be employed as approximations of fully optimized contours. A wide range of fabrication techniques may be employed for forming the diffractive element set, and any suitable technique(s) may be employed while remaining within the scope of the present disclosure and/or appended claims. The following are exemplary only, and are not intended to be exhaustive.

Diffractive elements may be formed lithographically on the surface of a multimode planar optical waveguide, or at one or both interfaces between core and cladding of a multimode planar optical waveguide. Diffractive contours may be formed lithographically in the interior of the core layer and/or a cladding layer of the planar optical waveguide using one or more spatial lithography steps performed after an initial partial deposition of layer material. Diffractive elements may be formed in the core and/or cladding layers by projecting ultraviolet light or other suitable radiation through an amplitude and/or phase mask so as to create an interference pattern within the multimode planar waveguide (fabricated at least in part with suitably sensitive material) whose fringe contours match the desired diffractive element contours. Alteration of the refractive index by exposure to ultraviolet or other radiation results in index-modulated diffractive elements. The mask may be zeroth-order-suppressed according to methods known in the art, including the arts associated with fabrication of fiber Bragg gratings. The amplitude and/or phase mask may be produced lithographically via laser writer or e-beam, it may be interferometrically formed, or it may be formed by any other suitable technique. In instances where resolution is insufficient to produce a mask having required feature sizes, a larger scale mask may be produced and reduced to needed dimensions via photoreduction lithography, as in a stepper, to produce a mask at the needed scale. Diffractive elements may be formed by molding, stamping, impressing, embossing, or other mechanical processes. A phase mask may be stamped onto the core or cladding surface followed by optical exposure to create diffractive elements throughout the core and or cladding region. The optical or UV source used to write the diffractive elements in this case should have a coherence length comparable or longer than the distance from the stamped phase mask to the bottom of the core region. Stamping of the phase mask directly on the device may simplify alignment of diffractive elements with ports or other device components especially when those components may be formed in the same or another stamping process. Many approaches to the creation of refractive index modulations or gratings are known in the art and may be employed in the fabrication of diffractive element sets.

Irradiation-produced refractive index modulations or variations for forming diffractive elements will optimally fall in a range between about $10^{-4}$ and about $10^{-1}$; however, refractive index modulations or variations outside this range may be employed as well. Refractive index modulations or variations may be introduced by light of any wavelength (including ultraviolet light) that produces the desired refractive index changes, provided only that the photosensitive material employed is suitably stable in the presence of light in the desired operating wavelength range of the spectral filter. Exposure of a complete set of diffractive elements to substantially spatially uniform, refractive-index-changing light may be employed to tune the operative wavelength range of the diffractive element set. Exposure of the diffractive element set to spatially non-uniform refractive-index changing light may be employed to chirp or otherwise wavelength-modulate the spectral filter (described further hereinbelow). The sensitivity of planar waveguide materials to irradiation produced refractive index modulations may be increased using hydrogen-loading, flame-brushing, boron or other chemical doping, or other method known in the art, for example in the context of making fiber Bragg gratings.

Figures 1A, 1B, 1C:
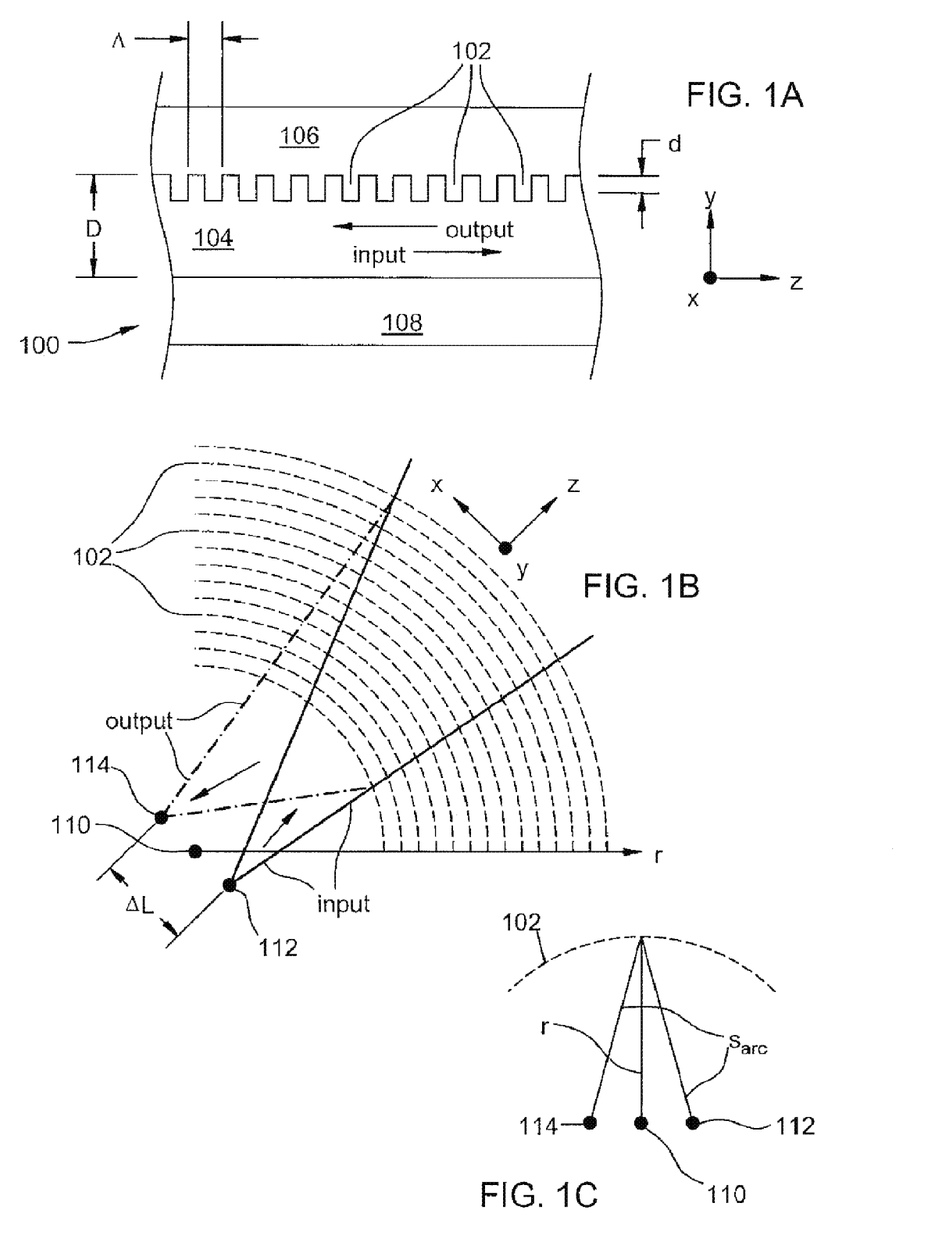
FIGS. 1A and 1B are side and top schematic views, respectively, of a planar waveguide spectral filter.
FIG. 1C is a schematic top view showing an optical path between input and output optical ports of a planar waveguide spectral filter.

A schematic overview of an exemplary planar waveguide spectral filter is shown in FIG. 1. In FIG. 1A, a cross section of a planar waveguide 100 (with core 104 and first and second claddings 106 and 108) shows diffractive elements 102 in cross section. In this exemplary embodiment, the diffractive elements are formed at the interface between core 104 and cladding 106, and comprise cladding material deposited into trenches etched to a depth d into the one surface of the waveguide core layer 104. The diffractive elements 102 may instead be filled with a material other than the cladding material, provided the material has a refractive index differing from the core refractive index. An optical signal propagates in the x- and z-dimensions through the planar waveguide (substantially confined in the y-dimension by the planar waveguide) and is backscattered by the diffractive elements. Light whose vacuum wavelength $\lambda_{vac}=2n_{eff}\Lambda$ will be most strongly backscattered (due to constructive interference among the portions of the incident optical signal diffracted by the individual diffractive elements). Here $n_{eff}$ is the effective waveguide refractive index and $\Lambda$ is the physical spacing between diffractive contours (defined herein in terms of the differences in the lengths of ray paths $s_{arc}$ between input and output ports for successive diffractive elements, as shown in FIG. 1C; the spacing may be averaged over a diffractive element if the ray pathlength is not constant across the diffractive element, i.e., if the diffractive element curvilinear contour is not fully spatially optimized). For example, if $\lambda_{vac}=1.5$ μm is to be reflected and the effective core refractive index for the mode of interest is 1.45, the one-way ray path spacing between diffractive elements should be about 0.517 μm.

It should be noted that the effective waveguide index is not simply the refractive index $n_{core}$ of the bulk material comprising the core. The effective core index reflects rather the property of a particular mode supported by the planar waveguide and represents the vacuum speed of light divided by the phase velocity of the guided wave along the guiding direction of the waveguide. In a single-mode waveguide, there is a unique effective index for light traveling within the waveguide (typically wavelength-dependent). For a multimode waveguide, the subject of the present disclosure, there is a range of effective waveguide refractive indices—one for each of the transverse optical modes that is supported by the waveguide. In the context of planar waveguides, "transverse optical mode" refers to optical modes having distinct electric field (E-field) amplitude variations along the direction locally normal to the plane of the planar waveguide. Each transverse optical mode actually comprises a family of modes having the same E-field variation along the local normal to the planar waveguide but having different propagation directions within the waveguide. The effective index for a particular optical mode is a function of the mode size and shape, the core index $n_{core}$, the first and second cladding indices $n_1$ and $n_2$, and the core thickness D (note these are not all independent of one another; the thickness and indices typically determine the mode size and shape). The refractive indices of the two claddings, $n_1$ and $n_2$, need not be the same. The cladding index closer to the core index (i.e., the greater of $n_1$ and $n_2$) shall be denoted hereinafter as $n_{clad}$. Note that air, dielectric, metallic, or other suitable cladding material may be employed. Core and cladding materials should be chosen to provide acceptably low absorptive and scattering losses. Many appropriate silica, semiconductor, polymer, and other materials are known in the planar waveguide art and may be employed within the scope of the present disclosure and/or appended claims.

In FIG. 1B, a top view of the diffractive element set is shown. Each dashed curve represents a diffractive element 102 (equivalently, a diffractive element virtual contour). In this example the diffractive elements are spatially defined by diffractive contours that are concentric circular arcs (with common center of curvature 110). Each diffractive element acts as a weak focusing mirror that images the input optical port 112 onto the output optical port 114, with the ports located at conjugate image points defined by the circular diffractive element contours. In a fully spatially optimized device, each diffractive element may be defined by a unique virtual contour designed so as to convert the input optical signal wavefront into an output optical signal wavefront matched as well as possible for effective optical coupling into the output optical port. Simpler curvilinear diffractive element contours (such as circular arcs in this example) may be employed as approximations of fully optimized contours. Optical coupling may be optimized by designing the diffractive element set to reside within and fill at least a portion of the region of overlap between the designed input optical signal beam and the designed output optical signal beam. The design output beam may be visualized by injecting a signal backwards through the output port so as to impinge on the diffractive element set. The time-reverse of the backward injected signal is the design output beam. The design input signal beam corresponds to a beam launched toward the diffractive element set through the input port. When the input and output ports are in close proximity and the design input and output beams are nearly anti-parallel, the overlap region will be of large extent along a line bisecting the angle between input and output beams. The diffractive element set need not fill this entire length. Along this bisector direction, the diffractive element set need only be long enough to provide desired spectral resolution or overall reflective strength. In a single mode waveguide, the fully optimized focusing contour is unique as there is only one mode involved. In a multimode waveguide (the subject of the present disclosure), coupling by the diffractive element set of all possible input modes to all of the possible output modes is relevant. FIG. 1C shows a particular ray path from the input optical port 112 to the output optical port 114. Typically, the spacing between diffractive contours is arranged so that optical ray paths like the one shown in FIG. 1C increment by a constant amount from one diffractive contour to the next. (As an aside, since for a specific optical mode the optical pathlength difference between diffractive elements depends on the relevant modal indices as well as the ray pathlength difference between the diffractive elements, and since the modal indices vary among the supported transverse modes, the optical path increment cannot be defined uniquely in a multimode waveguide. Therefore, when referring herein to a multimode waveguide, phrases such as "optical path difference" and so forth must be defined in a meaningful and consistent fashion. One such definition may assume the effective index for the lowest-order incident and diffracted modes. Another suitable definition may assume an average effective index for all supported modes. Yet another definition may assume the bulk core index $n_{core}$. Other suitable definitions may be used as well, and any suitable definition that reasonably approximates the modal indices, consistently applied, shall fall within the scope of the present disclosure and/or appended claims.) This constant optical ray path increment does not, however, necessarily result in uniform physical spacing between the diffractive element contours. In the exemplary embodiment of FIG. 1A-1C, diffractive contour spacings measured along the radial direction in FIGS. 1B and 1C are not constant, but instead are weakly chirped to yield a uniform increment in the optical ray path length. It is possible to vary the optical ray path increment to control the relative phase of signals diffracted by successive contours. Such control is useful for the introduction of various types of apodization.

Figure 2A:
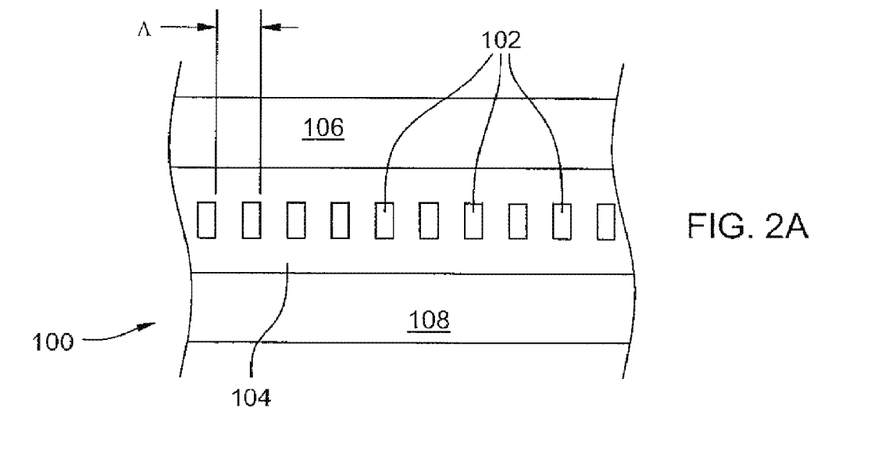
FIGS. 2A and 2B are side schematic views of planar waveguide spectral filters.
Figure 2B:
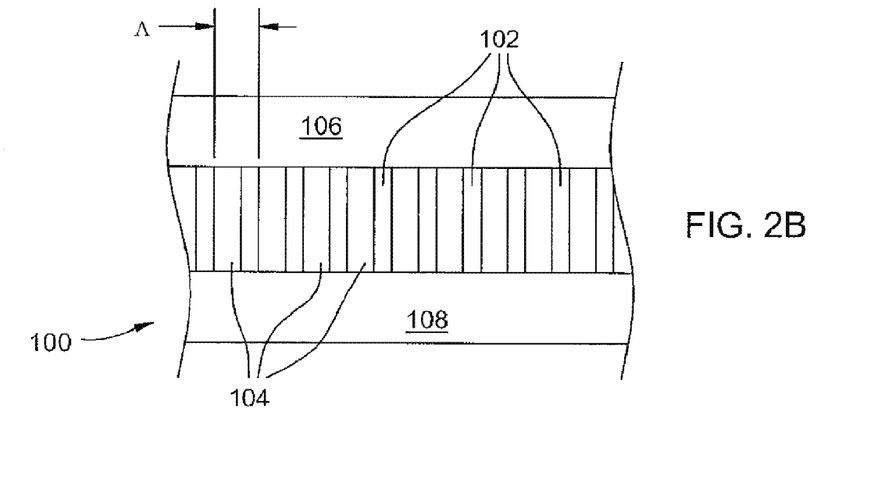

In FIG. 2A, a structure is shown wherein the diffractive elements 102 are located in the interior of the core 104. Such interior-located diffractive elements may more strongly interact with lower order transverse modes. In general, larger fractions of the transverse profiles of relevant transverse modes spanned by the diffractive elements, whether positioned at the core/cladding interface, within the core layer, and/or within the cladding layer, result in a correspondingly larger fraction of the input optical signal diffracted by the diffractive elements (for a given index contrast between the core and the diffractive elements). This in turn enables a desired level of optical power reflectivity by the diffractive element set using fewer diffractive elements. In FIG. 2B, the diffractive elements 102 span the entire thickness of the core layer 104. Diffractive elements spanning larger fractions of the transverse profiles of the relevant modes of the optical signal field would also tend to reduce variation in diffraction strength among the multiple transverse optical modes supported by the planar optical waveguide.

Figure 3:
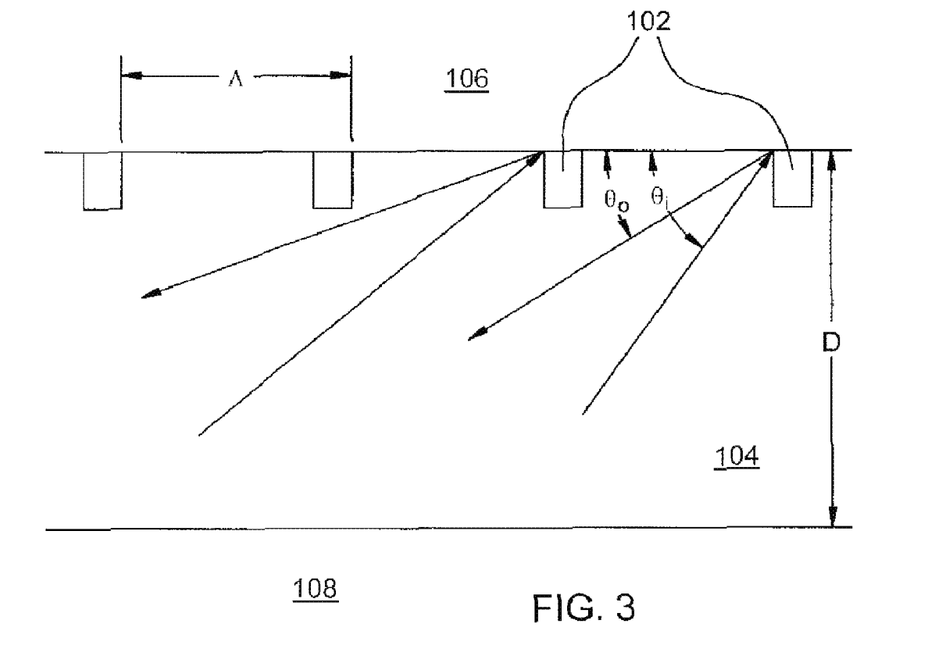
FIG. 3 is a side schematic view of a planar waveguide spectral filter.

In FIG. 3 is shown the schematic geometry of light backscattering from diffractive elements within a multimode planar waveguide. The diffractive element geometry shown (located at the core/cladding interface) is simplified to facilitate definition of incidence angles for a representative input mode and a representative back-diffracted mode, but the following would apply to any diffractive element geometry. Each transverse optical mode within a multimode planar optical waveguide may be thought of as a superposition of two plane waves, each of which makes an angle $\theta$ relative to the local plane of the waveguide (referred to as a propagation angle for the optical mode in question). Different transverse optical modes typically have different propagation angles $\theta$. The propagation angles $\theta_{in}$ and $\theta_{out}$ shown in FIG. 3 represent, respectively, the angles made by the constituent plane wave subcomponents of input and back diffracted optical modes of the waveguide. Note that the input angle, $\theta_{in}$, and the back-diffracted output angle, $\theta_{out}$, are not shown as being equal. In general, the diffractive element set can back-diffract a specific input optical mode into the same counter-propagating optical mode or into one or more of the other counter-propagating optical modes of the planar waveguide. The relative strength of diffraction into the same or different transverse optical modes depends on the geometry of the diffractive elements and their placement relative to the core layer 104.

Figure 4:
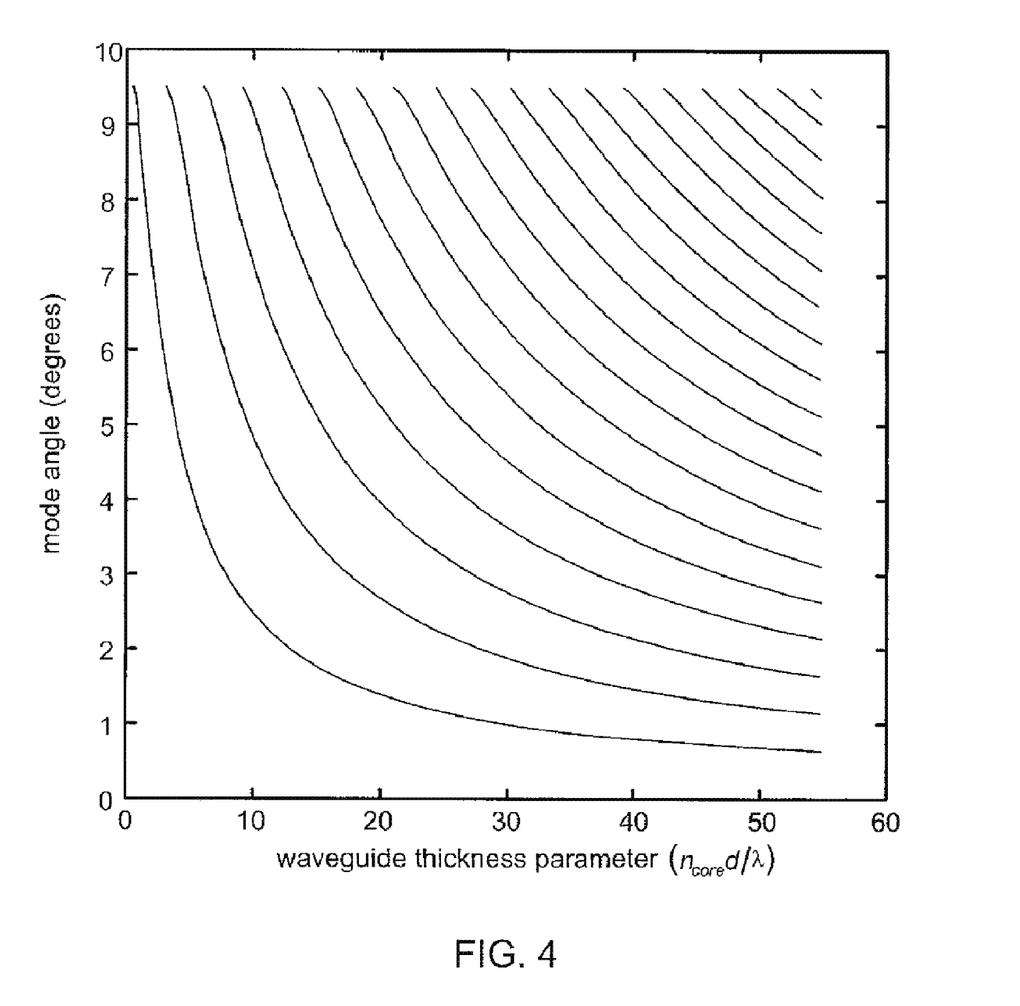
FIG. 4 illustrates the dependence of mode angle on planar waveguide thickness parameter.

Each input-mode-to-output-mode diffraction process will occur most strongly at a unique vacuum wavelength. Diffraction will occur strongly at wavelengths satisfying the following equation $$\lambda/n_{core}=\Lambda(\cos\theta_{in}+\cos\theta_{out})/m \quad (1)$$

where m=1, 2, 3, ... is the diffractive order. The angles in Eq. 1 are, as described above, the characteristic modal propagation angles for the incident and diffracted optical modes, respectively. In FIG. 4, we plot the characteristic modal propagation angles for all modes that exist in a planar guide as a function of the effective guide thickness $n_{core}d/\lambda$, where d is the physical waveguide thickness as shown in FIG. 1. To calculate FIG. 4, a core index $n_{core}$=1.45 and a cladding index $n_{clad}$=1.43 are assumed. As one moves to the right in FIG. 4, the waveguide core is getting thicker. Additional optical modes are supported as the core thickness increases. As each successive optical mode "turns on", its characteristic incidence angle begins near the critical angle of the core-cladding interface and then decreases as the waveguide becomes thicker. As the mode number increases, the modes become relatively evenly spaced throughout the angular range from 0° to the critical angle. Diffraction may occur from an input optical signal in any supported optical mode to a back-diffracted output optical field in any supported optical mode. If there are N supported modes, there are $N^2$ potential scattering processes—some of which may be degenerate.

The maximum back-diffracted wavelength occurs for the lowest-order optical mode diffracted back into the lowest-order optical mode. The minimum back-diffracted wavelength occurs for the highest-order support optical mode diffracted back into the highest-order supported optical mode. The interval between the maximum and minimum diffracted wavelengths, $\Delta\lambda$, can be approximated by $$\Delta\lambda=2\Lambda n_{core}(1-\cos\theta_H)/m \quad (2)$$

where we have approximated the propagation angle of the lowest-order optical mode to be 0° and the propagation angle of the highest-order supported optical mode to be $\theta_H=\pi/2-\sin^{-1}(n_{clad}/n_{core})$. In many cases of interest, the diffracted bandpass width, $\Delta\lambda$, is quite small relative to the diffracted vacuum wavelength $\lambda$. In such cases, we can approximate the diffracted vacuum wavelength as $\lambda=2n_{core}\Lambda/m$ and calculate a fractional filter bandpass ratio $$\Delta\lambda/\lambda=(n_{core}-n_{clad})/n_{core} \quad (3)$$

where we have inserted the definition of $\theta_H$ into Eq. 2 to yield Eq. 3. The fractional bandpass for the portion of the optical signal diffracted by the diffractive element set of the multimode spectral filter is found to be simply related, via Eq. 3, to the refractive index difference between the core and cladding. A more accurate value of $\Delta\lambda/\lambda$ for specific waveguide parameters can be calculated by standard methods well known in the art, but for many design purposes, Eq. 3 suffices.

Figure 5:
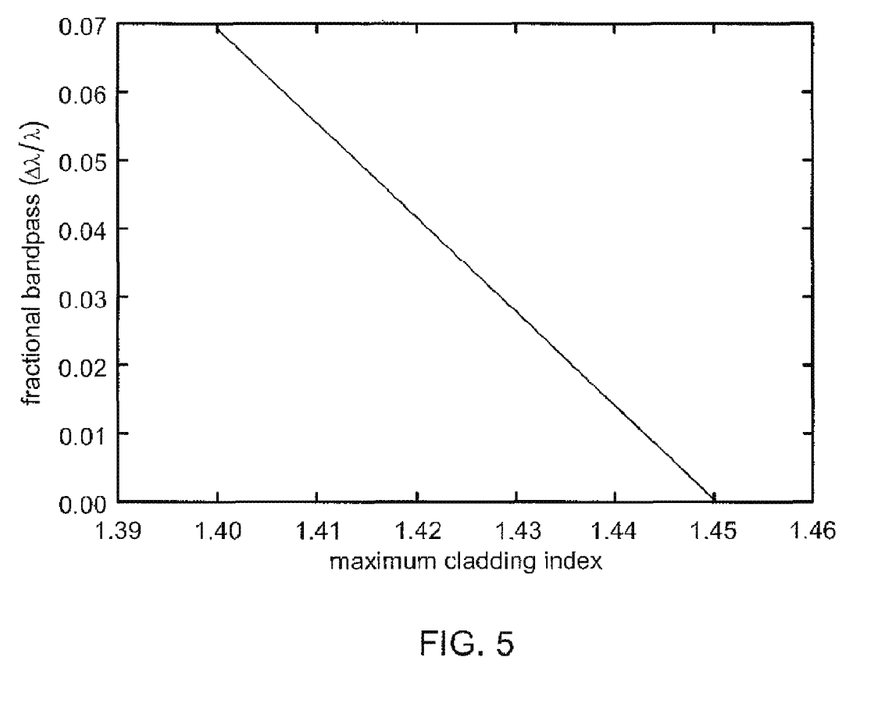
FIG. 5 illustrates the dependence of fractional bandpass on cladding index for a planar waveguide spectral filter.

In FIG. 5, the fractional bandpass of an exemplary multimode planar waveguide spectral filter with the core index 1.45 is shown as a function of cladding index. The fractional bandpass is approximately independent of the thickness of the waveguide core in the multiple transverse optical mode regime. It should be noted again that the waveguide need not necessarily have symmetric claddings. The fractional bandpass is essentially determined by the larger cladding index (i.e., the cladding index exhibiting the smaller index contrast with the core index). It may be desirable to have a relatively large refractive index differential when diffractive elements are formed from cladding material at a core-cladding interface, in order to increase diffraction strength or for other reasons. As long as one of the core-cladding interfaces has a sufficiently low refractive index contrast, the range of guided modes will remain small and Eq. 3 will typically suffice. An important design consideration for a multimode planar waveguide spectral filter is the degree to which the supported planar waveguide optical modes match the modes of input and output optical signal fields, for example optical modes supported by multimode optical fiber. The value of $n_{clad}$ not only affects the spectral filter bandwidth but also spatial mode matching to input/output optical signal fields. Minimal insertion losses will tend to occur when the respective angular spreads of the transverse modes supported by the planar optical waveguide and by input/output components (such as a multimode fiber, a multimode channel waveguide, an LED, a laser diode, and so forth) are substantially similar to one another.

One application for a multimode planar waveguide spectral filter is use as coarse WDM (wavelength division multiplexing) multiplexers and demultiplexers. In that application area, bandpass widths of about 10 nm are typically employed. With a 10-nm bandpass width and an operating wavelength of 1.5 microns, a minimal core-cladding index contrast of about 0.67 percent is required. Such an index contrast is readily achieved with many materials well known in the art.

It should be noted that $\Delta\lambda$ as given by Eqs. (2) and (3) is a wavelength range for the center wavelengths of individual mode-to-mode diffracted spectral peaks. A multimode planar waveguide spectral filter with constant optical path spacing among its diffractive elements will exhibit within this overall bandwidth $\Delta\lambda$ multiple discrete diffracted spectral peaks corresponding to the diffraction of the various forward optical modes into the various backward optical modes. If these mode-to-mode diffracted spectral peaks are narrower than $\Delta\lambda$, then $\Delta\lambda$ is a good approximation of the overall bandwidth for the portion of the optical signal diffracted by the spectral filter (referred to as $\Delta\lambda_{filter}$). If, on the other hand, the mode-to-mode diffracted spectral peaks are broader than $\Delta\lambda$, then the overall spectral width $\Delta\lambda_{filter}$ is at least as broad as the broadest mode-to-mode diffracted spectral peak. If the diffractive element set has substantially constant optical path spacing along its operative optical path and the diffractive element set is on the 1-cm scale, these individual mode-to-mode diffracted spectral peaks will be on the order of 10 GHz wide (for a core refractive index of about 1.5 and if the diffractive element set is only weakly, i.e. less than about 70%, reflective). In the low reflective strength limit, the individual spectral peaks broaden in inverse proportion to the length of the diffractive element set. The overall length of the diffractive element set maybe reduced until adjacent diffracted spectral peaks overlap, or become comparable to or greater than the overall bandpass $\Delta\lambda$. The individual mode-to-mode reflective bands would then substantially continuously span a spectral profile that encompasses the overall diffracted bandwidth given approximately by Eqs. 2 and 3. Shortening the diffractive element set will, however, also weaken the reflection strength of the diffractive element set and therefore increase insertion loss. Increasing the diffractive strength of individual diffractive elements may at least partly compensate for this.

In some cases, a multimode planar waveguide spectral filter having a reflection spectrum consisting of a series of adjacent diffracted peaks may provide useful functionality. For example, a WDM system based on multiplexing spectral slices of light-emitting diode (LED) sources may be implemented and not depend critically on the detailed passband properties of the multiplexer/demultiplexer (mux/demux) employed. Such an LED spectral slicing WDM device may instead depend primarily on the central reflective channel wavelengths and channel widths (Eq. 3). Using matched mux and demux multimode spectral filters having the same reflective passband structure will tend to minimize net insertion loss. It should be noted that multi-mode planar waveguide devices are well suited to work with LED sources since the multimode planar waveguide readily accepts light in many transverse input optical modes and a continuum of in-plane optical modes.

The discrete narrow diffracted spectral peaks characteristic of a fixed-optical-spacing multimode spectral filter may be shifted so that the diffractive element set provides a smooth continuous reflective profile throughout the fractional bandwidth given by Eq. 3. For example, the diffractive element set may be formed so that the optical spacing between successive diffractive elements is chirped along the set. Local quantities $\Lambda_{loc}$, $\Delta\lambda_{loc}$, and $\lambda_{loc}$, characterizing localized portions of the diffractive element set, would be used in Equations (1), (2), and (3). The chirp may be sufficiently strong so that the mode-to-mode diffracted spectral peaks are shifted by an amount at least as large as the maximum local bandpass $\Delta\lambda_{loc}$ for the diffractive element set. As a result, the overall diffractive spectral profile of the multimode spectral filter would be substantially continuous, and would be at least as spectrally broad as the larger of the broadest mode-to-mode peak or $2\Delta\lambda_{loc}$. Instead of a monotonic variation of $\Lambda_{loc}$, $\Delta\lambda_{loc}$, and $\lambda_{loc}$ along the diffractive element set (i.e., chirp), the optical spacing of the diffractive elements may be varied in many ways so as to provide a single smooth reflection spectrum for the diffractive element set. For example, the diffractive element set could be divided into discrete segments, each having constant values of $\Lambda_{loc}$, $\Delta\lambda_{loc}$, and $\lambda_{loc}$ that differ from other segments of the set. The variations in $\Lambda_{loc}$, $\Delta\lambda_{loc}$, and $\lambda_{loc}$ may be achieved in a variety of ways. The physical spacing (i.e., ray path increment) of the diffractive elements may be spatially varied within a set (chirped, segmented, or otherwise). This may be achieved by suitable adaptation of the spatially selective fabrication of the diffractive element set, for example, by suitable modification of a lithographic mask or a stamping pattern. Alternatively, the effective modal indices may be spatially varied within a set of diffractive elements, thereby altering $\Lambda_{loc}$, $\Delta\lambda_{loc}$, and $\lambda_{loc}$ for a fixed physical spacing of the diffractive elements. This may be accomplished in a variety of ways, for example, by spatially varying exposure of sensitive waveguide material to ultraviolet radiation.

In order to make a multiplexer or demultiplexer using sets of diffractive elements, individual diffractive element sets may be overlapped, interleaved, overlaid, and/or positioned sequentially in/on the planar waveguide. For a demux, polychromatic light enters a single input optical port. Multiple overlapped, interleaved, overlaid, or sequential diffractive element sets are employed, each of which has a diffractive element optical spacing (constant or otherwise) set to be reflective within one (or more) spectral channels, and each of which routes reflected light from the input optical port to one of multiple output optical ports. The multiple diffractive element sets collectively route light from the input optical port to the multiple output optical ports with a predetermined mapping of input spectral channels to output optical ports—each diffractive element set handles the mapping of one or more spectral channels to a specific output optical port. A multiplexer operates in a reverse manner from the demultiplexer.

The curvilinear shape of the diffractive element contours may be determined by a variety of standard optical imaging system design tools. Essentially, each diffractive element contour may be optimized to image the input port onto the output port in a phase coherent manner. Inputs to the design are the detailed structure of the optical input and output ports and their locations. Standard ray tracing approaches to optical element design may provide a diffractive contour at each optical distance into the planar waveguide that will provide an optimal imaging of the input signal at the input port onto the optimal output signal at the output port. Simple curves may be employed as approximations of the fully optimized contours. Diffractive contours are spaced by an optical path difference (as described above) that provides for the field image of successive diffractive contours to be substantially in phase at a desired wavelength. If the overall response of the diffractive element set is to be apodized with phase modulation, the optical spacing of successive diffractive element contours may be controlled to provide required phase differences between diffracted components at the output port.

An alternative approach to designing the diffractive element contours for a diffractive element set is to calculate interference patterns between simulated fields at a desired wavelength entering the input port and exiting the output port in specific planar waveguide optical transverse modes. One approach is to consider the interference pattern of each input mode having a desired optical field variation in the plane of the slab waveguide and calculating the interference pattern with a field coupled by the diffractive element set to a desired output optical field variation in the plane of the slab at the output port. The net pattern to be formed or written as a set of diffractive elements would be the sum of the individual calculated mode-to-mode interference patterns. In forming or writing a summed pattern for the diffractive element set, suitable discretization is applied as needed for any lithographic or UV exposure approach that is utilized for fabrication. It is also possible to form or write the diffractive element set based on a single input-mode-to-output-mode interference pattern to preferentially couple certain modes through the planar waveguide.

In an alternative method for making the diffractive element structure, the core consists of a material of appropriate index that is also photosensitive at the wavelength of the desired operational signal beams. As in traditional holography, the input and output recording beams (same wavelength as operational signal beams of the envisioned device) are overlapped in the core and the interference pattern between them is recorded. Subsequently the core material is developed and, if necessary, a cladding may be deposited or attached by other means.

The holographic structure may also be designed by interference of computer-generated beams. Unlike in single mode waveguides, the resulting interference pattern extends in all three spatial dimensions. Reduction to a planar slab waveguide may occur by slicing through an appropriate horizontal cross section of the interference pattern. Alternatively, the three dimensional hologram can be built up and approximated by combining several of the discrete cross-sections and then stacking them up. This may be implemented in several lithographic steps.

It should be noted that many of the embodiments depicted in this disclosure are only shown schematically, and that not all the features may be shown in full detail or in proper proportion and/or location. Certain features or structures may be exaggerated relative to others for clarity. In particular, it should be noted that the numbers of diffractive elements in an actual device may typically be larger than that shown in the Figures. The numbers of diffractive elements is reduced in the Figures for clarity. It should be further noted that the embodiments shown in the Figures are exemplary only, and should not be construed as specifically limiting the scope of the written description or the claims set forth herein. It is intended that equivalents of the disclosed exemplary embodiments and methods shall fall within the scope of the present disclosure. It is intended that the disclosed exemplary embodiments and methods, and equivalents thereof, may be modified while remaining within the scope of the present disclosure.

What is claimed is:

1. A method, comprising:
    receiving an optical signal by an optical waveguide configured to substantially confine in one transverse dimension the optical signal propagating therein; and
    outputting, from the optical waveguide, at least one diffracted portion of the optical signal diffracted by a corresponding one of at least one diffractive element set of the optical waveguide, wherein:
        the optical waveguide is configured to support multiple optical transverse modes in the confined transverse dimension;
        the at least one diffractive element set is configured to route, between a corresponding input optical port and a corresponding output optical port, the corresponding diffracted portion of the optical signal propagating in the optical waveguide; and
        the corresponding diffracted portion of the optical signal reaches the output optical port as a superposition of multiple transverse optical modes supported by the optical waveguide.

2. A method, comprising:
    forming an optical waveguide configured to substantially confine in one transverse spatial dimension an optical signal propagating therein; and
    forming at least one diffractive element set in the optical waveguide, wherein:
        the optical waveguide is configured to support multiple optical transverse modes in the confined transverse dimension;
        the at least one diffractive element set is configured to route, between a corresponding input optical port and a corresponding output optical port, a corresponding portion of the optical signal propagating in the optical waveguide that is diffracted by the at least one diffractive element set; and
        the at least one diffractive element set and the optical waveguide are configured so that the corresponding diffracted portion of the optical signal reaches the corresponding output optical port as a superposition of multiple optical transverse modes supported by the optical waveguide.

3. The method of claim 1 wherein the at least one diffractive element set acts as a spectral filter.

4. The method of claim 3, further comprising using the spectral filter as a wavelength division multiplexing (WDM) device.

5. The method of claim 2 wherein said forming the optical waveguide includes forming a planar optical waveguide.

6. The method of claim 2 wherein said forming the optical waveguide includes forming at least a portion of the optical waveguide on silicon-based material.

7. An apparatus, comprising:
    optical waveguide means for receiving an optical signal and for substantially confining in one transverse dimension the optical signal propagating therein; and
    at least one diffractive element set of the optical waveguide means, wherein:
        the optical waveguide means supports multiple optical transverse modes in the confined transverse dimension;
        the at least one diffractive element set is configured to route, between a corresponding input optical port and a corresponding output optical port, a corresponding portion of the optical signal propagating in the optical waveguide means that is diffracted by the at least one diffractive element set; and
        the corresponding diffracted portion of the optical signal reaches the output optical port as a superposition of multiple transverse optical modes supported by the optical waveguide means.

8. The apparatus of claim 7 wherein the at least one diffractive element set is configured as a spectral filter.

9. The apparatus of claim 7 wherein the optical waveguide means includes a planar optical waveguide.

10. The apparatus of claim 7 wherein at least a portion of the optical waveguide means is formed on silicon-based material.

11. A system, comprising:
an optical apparatus that includes:
an optical waveguide configured to receive an optical signal and to substantially confine in one transverse dimension the optical signal propagating therein; and
at least one diffractive element set of the optical waveguide, wherein:
the optical waveguide is configured to support multiple optical transverse modes in the confined transverse dimension;
the at least one diffractive element set is configured to route, between a corresponding input optical port and a corresponding output optical port, a corresponding portion of the optical signal propagating in the optical waveguide that is diffracted by the at least one diffractive element set; and
the corresponding diffracted portion of the optical signal reaches the output optical port as a superposition of multiple transverse optical modes supported by the optical waveguide.

12. The system of claim 11, further comprising electronic circuitry, coupled to the output optical port, to receive an output optical signal from the output optical port.

13. The system of claim 11 wherein the at least one diffractive element set is configured as a spectral filter.

14. The system of claim 13 wherein the spectral filter is part of a wavelength division multiplexing (WDM) device.

* * * * *

UNITED STATES PATENT AND TRADEMARK OFFICE
CERTIFICATE OF CORRECTION

PATENT NO.        : 8,180,188 B2
APPLICATION NO.   : 12/785950
DATED             : May 15, 2012
INVENTOR(S)       : Mossberg et al.

It is certified that error appears in the above-identified patent and that said Letters Patent is hereby corrected as shown below:

Title Page;

On Page 3, in Field (56), under "FOREIGN PATENT DOCUMENTS", in Column 1, Line 8, delete "WO 9956159 11/1999".

On Page 3, in Field (56), under "FOREIGN PATENT DOCUMENTS", in Column 1, Line 11, delete "WO 02075411 9/2002".

On Page 4, in Field (56), under "OTHER PUBLICATIONS", in Column 1, Line 68, delete "Acoust" and insert -- Acoustical --, therefor.

On Page 5, in Field (56), under "OTHER PUBLICATIONS", in Column 1, Line 22, delete "Techology" and insert -- Technology --, therefor.

In Column 2, Line 19, delete "claims" and insert -- claims. --, therefor.

Signed and Sealed this
Thirteenth Day of November, 2012

David J. Kappos
*Director of the United States Patent and Trademark Office*